(12) United States Patent
Cancio et al.

(10) Patent No.: US 7,442,332 B2
(45) Date of Patent: Oct. 28, 2008

(54) METHOD AND APPARATUS FOR UNIFORMLY STRETCHING THERMOPLASTIC FILM AND PRODUCTS PRODUCED THEREBY

(75) Inventors: Leopoldo V. Cancio, Cincinnati, OH (US); Thomas G. Mushaben, West Chester, OH (US); Robert M. Mortellite, Maineville, OH (US); Pai-Chuan Wu, Cincinnati, OH (US)

(73) Assignee: Clopay Plastic Products Company, Inc., Mason, OH (US)

( * ) Notice: Subject to any disclaimer, the term of this patent is extended or adjusted under 35 U.S.C. 154(b) by 717 days.

(21) Appl. No.: 10/838,920

(22) Filed: May 4, 2004

(65) Prior Publication Data
US 2005/0248051 A1 Nov. 10, 2005

(51) Int. Cl.
*B29C 47/06* (2006.01)
*B29C 55/18* (2006.01)

(52) U.S. Cl. .............. 264/173.16; 264/209.5; 264/210.1

(58) Field of Classification Search .............. None
See application file for complete search history.

(56) References Cited

U.S. PATENT DOCUMENTS

| | | | |
|---|---|---|---|
| 3,796,785 A | 3/1974 | Rest et al. | 264/288 |
| 3,832,267 A | 8/1974 | Lin | 161/116 |
| 4,116,892 A | 9/1978 | Schwarz | |
| 4,153,751 A * | 5/1979 | Schwarz | 521/50 |
| 4,289,832 A | 9/1981 | Schwarz | |
| 4,438,167 A | 3/1984 | Schwarz | |
| 4,704,238 A | 11/1987 | Okuyama et al. | |
| 5,296,184 A | 3/1994 | Wu et al. | |
| 5,382,461 A | 1/1995 | Wu | |
| 5,422,172 A | 6/1995 | Wu et al. | |
| 5,851,937 A | 12/1998 | Wu et al. | |
| 5,861,074 A | 1/1999 | Wu et al. | |
| 5,865,926 A | 2/1999 | Wu et al. | |
| 6,013,151 A | 1/2000 | Wu et al. | |
| 6,114,024 A | 9/2000 | Forte | |
| 6,214,147 B1 | 4/2001 | Mortellite et al. | |
| 6,265,045 B1 | 7/2001 | Mushaben | |
| 6,287,499 B1 * | 9/2001 | Roby et al. | 264/210.5 |
| 6,676,871 B1 | 1/2004 | Benassi et al. | |
| 6,719,935 B2 * | 4/2004 | Tunc | 264/40.7 |
| 2003/0162010 A1 | 8/2003 | Forte | |

FOREIGN PATENT DOCUMENTS

| | | |
|---|---|---|
| EP | 0 848 663 | 2/1997 |
| EP | 1 038 653 A2 | 9/2000 |
| EP | 1 095 758 A2 | 5/2001 |
| NL | 1011404 C2 | 8/2000 |

* cited by examiner

*Primary Examiner*—Monica A Huson
(74) *Attorney, Agent, or Firm*—Wood, Herron & Evans LLP

(57) ABSTRACT

Thermoplastic films and laminates are made by extrusion and stretching using differential speed rollers employing a short stretching gap of no more than one inch immediately after the extruded film product is formed. The method and apparatus control the thickness of the stretched film and impart desirable mechanical properties thereto such as film products with a high modulus for handling and suitable tensile for softness.

51 Claims, 5 Drawing Sheets

Fig. 1
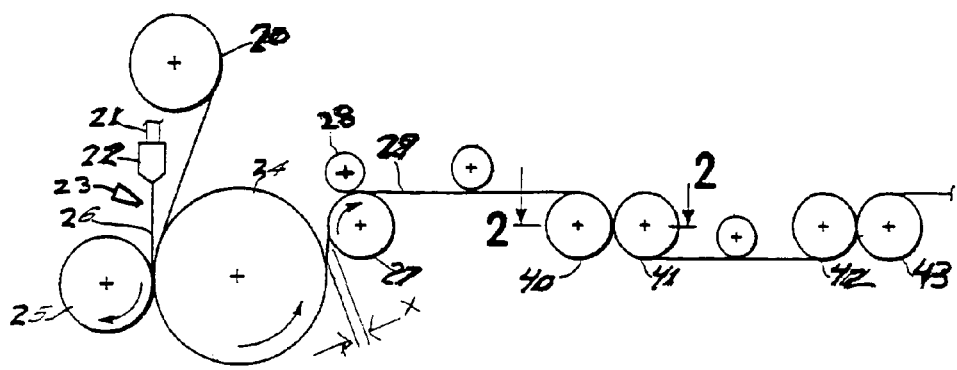
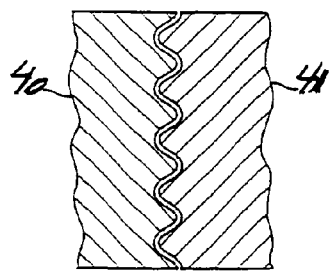
Fig. 2
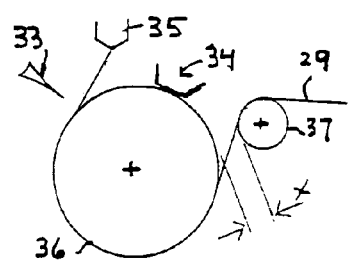
Fig. 3

Example V

METHOD AND APPARATUS FOR UNIFORMLY STRETCHING THERMOPLASTIC FILM AND PRODUCTS PRODUCED THEREBY

TECHNICAL FIELD OF THE INVENTION

This invention is directed to a method for uniformly stretching a thermoplastic film, thereby controlling thickness of the stretched film and imparting desirable mechanical properties thereto.

BACKGROUND OF THE INVENTION

There are three common ways to stretch thermoplastic films. One is referred to as machine direction orientation (MDO) which involves stretching the film between two pairs of rollers. The film is pinched in the nip of a first pair of rollers, which are running at a relatively slow speed, and a second pair of rollers, downstream from the first pair, which are operating faster than the first pair. Because of the difference in run speeds, the film in between the roller pairs must either stretch or break to accommodate the difference. The ratio of the roller speeds will roughly determine the amount that the film is stretched. For example, if the first pair is running at 100 feet per minute (fpm) and the second pair is running at 300 fpm, the film will be stretched to roughly three times it original length. The MDO method stretches the film in the machine direction (MD) only. The MDO stretching method is used to create an oriented film or a microporous film, for example, where the film contains a dispersed inorganic filler which creates microporosity upon stretching. The micropores formed in the microporous film as stretched by MDO tend to be oval and are relatively large, for example, up to 1.5 microns on the long axis. An early example of stretching or orienting a microporous film to improve gas and moisture vapor transmission by differential speed rollers is U.S. Pat. No. 3,832,267 which issued in 1974. This '267 patent also discloses a second method of stretching which is called tentering. In simplest terms, the tentering method involves grabbing the sides of the film and stretching it sideways. For many years this was the only way to stretch film from side to side, or in the cross direction (CD). The tentering method tended to be slow and, because the forces are concentrated on the edges of the film, often the film did not stretch evenly. U.S. Pat. No. 4,704,238 discloses a tentering apparatus having a pre-heating zone and a stretching zone, followed by a heat setting zone to facilitate the stretching of a preformed blown or cast film. In this '238 patent, the thermoplastic film contains inorganic fillers such as calcium carbonate which, when stretched by tentering and/or heat tempering, produces a microporous film. Another example of MDO stretching of polymeric film and multilayered film is EP 848663 where an extruded film product may first be cooled, and then later heated and stretched to form a breathable film product. Additionally, the extruded film may be stretched immediately after extrusion, before it is cooled.

A third method of stretching involves incremental stretching of thermoplastic film. This method is described in the early patent literature, for example, U.S. Pat. Nos. 4,153,751; 4,116,892; 4,289,832 and 4,438,167. In the practice of this method, the film is run between grooved or toothed rollers. The grooves or teeth on the rollers intermesh without touching when the rollers are brought together and, as the film passes between the rollers, it is stretched. Incremental stretching has the advantage of causing the film to stretch in many small increments that are evenly spaced over the entire film. This results in a more evenly stretched film, something that is not always true for MDO stretching and is almost never true for tentering. Incremental stretching allows one to stretch the film in the MD, CD and at angle or any combination of these three directions. The depth at which the intermeshing teeth engage controls the degree of stretching. Often, this incremental method of stretching is simply referred to as CD, MD or CD/MD. A number of U.S. patents have issued for incrementally stretching thermoplastic films and laminates. An early example of the patent art which discloses a method of incrementally stretching film is U.S. Pat. No. 5,296,184. Other relevant patents regarding the incremental stretching of thermoplastic films and laminates include U.S. Pats. Nos. 6,265,045; 6,214,147; 6,013,151; 5,865,926; 5,861,074; 5,851,937; 5,422,172 and 5,382,461.

The above brief description of stretching techniques and apparatus to produce an oriented or stretched polymeric film illustrates the efforts that have been made to produce film products having desirable aesthetic and mechanical properties. Notwithstanding these efforts, there is an ongoing effort to improve known methods for producing thermoplastic films and laminates thereof to achieve quality products having improved properties. Moreover, there is a continuing effort to improve apparatus for producing oriented or stretched thermoplastic film without significant capital expenditures. It has been a very desirable objective to make improvements with savings in capital expenditures and processing costs, yet with production of quality products.

SUMMARY OF THE INVENTION

This invention is directed to a method of making a stretched thermoplastic film having substantially uniform gauge with improved mechanical properties. The method involves extruding the thermoplastic extrudate in the form of a web in its molten state and locating differential speed rollers to chill the film to its solid state and stretching the film between the rollers to achieve a stretched film having a substantially uniform gauge.

It has been found critical in accordance with the principles of this invention, in order to achieve its objectives and advantages, to locate a second roller downstream from the first chill roller to provide a stretch or roll gap of no more than 1 inch (simply hereinafter "short gap") between the rollers for stretching the film. It has been found if the short gap is not maintained, that thermoplastic film products having the desired mechanical properties and aesthetics are not obtained. For example, the short gap apparatus and method according to this invention enable the production of film products where the gauge or thickness is substantially uniformly maintained. This control over film thickness eliminates what is referred to in the trade as "tiger stripes" which are visual evidence of nonuniformity in thickness which renders the film somewhat ugly and aesthetically undesirable, especially since the film products are used in the fabrication of clothing where its unsightliness is undesirable. In addition, film products are desired where modulus and tensile strengths need to be maintained in order to have useful products.

The desired objectives of this invention are achieved by utilization of the residual extrusion heat upon film formation to facilitate the stretching immediately after film extrusion. However, this desirable savings of heat energy will not necessarily result in the production of a satisfactory product, unless the short gap for film stretching is utilized. Experimental data in the detailed operating examples of this invention, as hereinafter described, illustrate the practice of this invention and the obtainment of the desired results.

This invention enables the conversion of a conventional cast extrusion line to an MDO processing line without making a capital expenditure for conventional MDO equipment. In addition, the present invention reduces energy costs because the extra step of heating the cooled web in a typical MDO stretching process is eliminated.

This invention also enables a conventional cast extrusion line to produce polymer film at a rate of speed exceeding the limits of the extruder. For instance, one limitation to the speed at which thermoplastic polymers can be extruded is the onset of draw resonance as the extrudate exits the extruder die. If a given extruder can produce extrudate at a maximum rate of 1000 linear feet per minute without resonance, this invention makes it possible to stretch the resulting product without draw resonance in order to produce 2000, 3000, 4000, or even more linear feet per minute (fpm) at the winder. Thus, in this embodiment of the invention, the velocity ($V_1$) of the extrudate is slightly below that where the onset of draw resonance in the extruded web occurs. The extruded film at $V_1$ having a certain original thickness is then stretched in the short stretch gap at a velocity ($V_2$) which is in the range of up to about 4, i.e., about 2 to 4, or more, times the velocity $V_1$. The resulting film product has a gauge which is thinner by corresponding ratios of, for example, about 2 to 4 or more times thinner than the original extruded film. Accordingly, commercially acceptable thin films of substantially less than 1 mil, e.g., 0.4 to 0.6 mil, of uniform gauge can be produced at high speeds of 2000 to 4000 fpm, or more, by the method and apparatus of this invention.

From a compositional standpoint, in brief, the thermoplastic film products comprise a polymer consisting of polyolefin, polyester, nylon and blends or coextrusions of two or more of such polymers. Where a microporous film product or laminate is desired, the thermoplastic extrudate contains a dispersed phase of pore-forming particles which may be an inorganic filler or organic particles. Depending upon the polymer and desired degree of microporosity to achieve breathability, the temperature of the film and the short gap between the rollers is in the range of between 20° to 100° C.

One of the objectives of the invention is to achieve a film product with a high modulus for handling and suitable tensile for softness. Elastomeric polymers may also be used as the thermoplastic extrudate including metallocene polymers involving copolymerization of ethylene with an alpha-olefin comonomer such as butene, hexene or octene.

The invention is also directed to an apparatus for making a stretched thermoplastic film comprising an extruder for extruding the thermoplastic extrudate and differential speed rollers to chill the film and provide a roll gap of no more than 1 inch for stretching the film to provide a film of uniform gauge thickness. The chill roller may comprise an embossing metal roller or a flat chrome roller, typically in combination with the backing of a rubber roller or metal roller to achieve desirable film properties and aesthetics such as an embossed cloth-like surface, matte finish or other textures. The backing roller cooperates with the chill roller to form a nip for receiving the molten web and facilitating stretching. Similarly, the second roller which operates at a peripheral speed higher than the chill roller to facilitate stretching in the short gap may cooperate with another backing roller in order to form a second nip for receiving the film from the first nip. Typically the second roller is a metal roller and the backing roller is a rubber roll.

The apparatus for forming the short gap can be combined with incremental stretching rollers which further treat the stretched film by incrementally stretching it. Incremental stretching of the film modifies the mechanical properties of the film that have been achieved by stretching the film in the short gap. For instance, the various textures and aesthetics may be modified by a further incremental stretching which affects the moisture vapor transmission rate (MVTR) and air breathability of the film. The incremental stretching rollers are usually comprised of a first section and a second section for incrementally stretching the film in a first direction (MD) followed by incrementally stretching in a second direction (CD), preferably substantially perpendicular to the MD.

The following detailed description and examples illustrate the method of making the thermoplastic film products of this invention and the apparatus. In light of these examples and this detailed description, it is apparent to a person of ordinary skill in the art that variations thereof may be made without departing from the scope of the invention. Furthermore, other benefits, advantages and objectives of this invention will be further understood with reference to the detailed description.

BRIEF DESCRIPTION OF THE DRAWINGS

This invention is further understood with reference to the drawings in which:

FIG. 1 is a schematic of an in-line extrusion process with MDO stretching and incremental stretching for making the film or film laminate of this invention using the short stretching gap "x";

FIG. 2 is a cross-sectional view taken along 2-2 of FIG. 1 illustrating intermeshing rollers in diagrammatic form;

FIG. 3 is a schematic of an alternative form of the MDO stretching apparatus with the short gap "x"

DETAILED DESCRIPTION OF THE INVENTION

Figure 4:
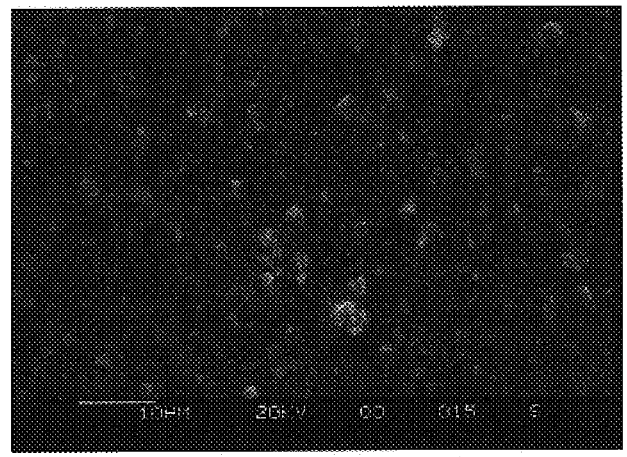
FIG. 4 is a SEM photomicrograph of an unstretched film of Example I-O.
Figure 5:
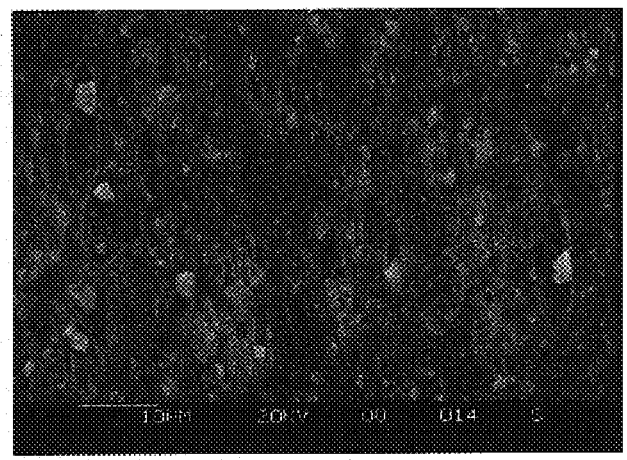
FIG. 5 is a SEM photomicrograph of a stretched film of Example I-A.
Figure 6:
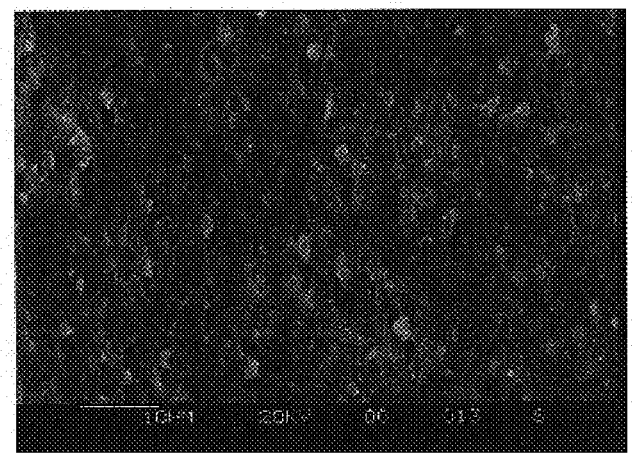
FIG. 6 is a SEM photomicrograph of a stretched film of Example I-B.
Figure 7:
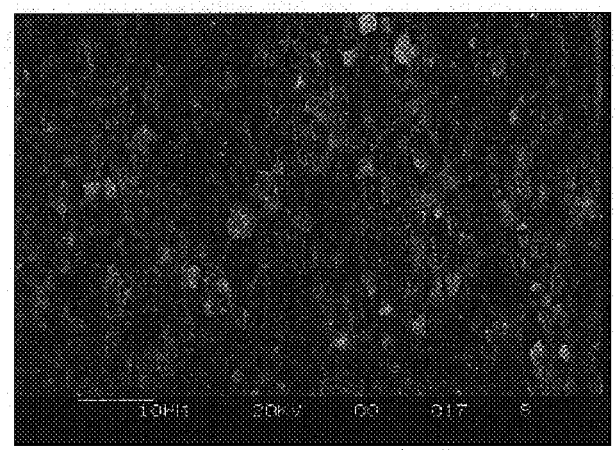
FIG. 7 is a SEM photomicrograph of a stretched film of Example I-C.
Figure 8:
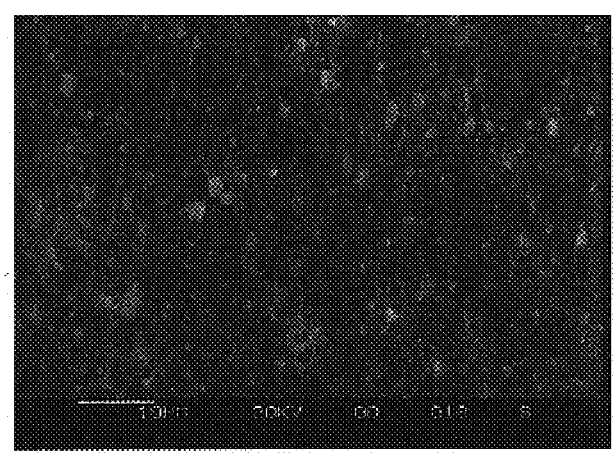
FIG. 8 is a SEM photomicrograph of a stretched film of Example I-D.

It is one objective of this invention to convert a conventional cast extrusion line to make a stretched MDO thermoplastic film product without making a capital expenditure for MDO equipment which is conventionally used to perform MDO processing. In addition, it is an objective of the present invention to save money and energy in the production of thermoplastic film and laminate products. It is also an objective of this invention to simplify the processing and stretching of thermoplastic film by elimination of extra steps such as heating a cool web in a typical MDO process. It is also an objective of this invention to produce thermoplastic film at a rate of speed in excess of the limitations of the extruder. One of the benefits of this invention is the obtainment of a stretched thermoplastic film having a substantial uniform gauge and desirable mechanical properties such as tensile, impact and modulus. Thermoplastic films and laminates are produced according to the invention which are aesthetically desirable, i.e., having a cloth-like appearance and feel. Microporous film products having significant moisture vapor transmission rates are also produced.

The above objectives and benefits of this invention are achieved, with reference to FIG. 1 which shows an in-line film extrusion lamination system with MDO stretching and, optionally, a CD+MD interdigitating roller section. The conventional film extrusion system involves an extruder 21 and a die 22. Thermoplastic web 26 is extruded in its molten state from the die 22 past an air knife 23 into a nip which involves a rubber roller 25 and metal roller 24. When a nonwoven and film laminate is desired, the nonwoven 20 is supplied to web 26. The surface of rubber roller 25 is typically cooled by immersing it partially in a water tank which is not shown. The film 26 is cooled by an air knife 23 of FIG. 1 or by an air knife 33 and vacuum box 34 which operates in conjunction with die 35 and metal rollers 36, 37 as shown in the alternative embodiment of FIG. 3. The metal roller 24 can be an engraved pattern or a flat chrome roller to produce either embossed or flat film and it is cooled to a specific temperature after passing through the nip of the metal roller 24 and rubber roller 25. The metal roller 24 serves as a chill roller which is typically controlled at a temperature ($T_1$) to receive and cool the web to its molecularly orientable and stretchable state. The second roller 27 is also typically maintained at a temperature ($T_2$) which is at or lower than $T_1$. The temperatures $T_1$ and $T_2$ are maintained depending upon the film properties required, and are typically in the range of between about the glass transition temperature (Tg) and the melting temperature (Tm) of the polymer present at the highest concentration in the film. The film is uniformly stretched in the roll gap x at a stretch temperature of between $T_1$ and $T_2$ at a speed between $V_1$ and $V_2$ to form the stretched thermoplastic film having a substantially uniform gauge.

The thermoplastic web 26 will be formed flat or embossed and cooled to a specific temperature after passing over the metal roller 24 which is typically controlled at a temperature $T_1$ between Tg and Tm of the main polymer (for example between 70-160° F. for polyolefin compositions of PE, LLDPE, HDPE or PP) and stripped away by passing through another metal roller 27 which is typically controlled at a temperature $T_2$ at or below $T_1$ on the film property required. At this point, the film 29 is formed and cooled, and will go downstream where it can be wound into a roll form for different applications. Where incremental stretching is desired, the MDO stretched film 26 is passed through intermeshing rollers 40, 41 and 42,43 for stretching in the MD and CD, respectively. A rubber roller 28 can be added to form another nip with the metal roller 27. This nip formed by rubber roller 28 and metal roller 27 can be adjusted horizontally or vertically to form a gap x between the nip of metal roller 24. The gap between the metal rollers 24 and 27 is at 0.005" to 1", and the metal roller 27 usually runs at about 1.5 to 5 times faster than the metal roller 24. The ratio of the speed of the metal roller 27 in feet per minute to the metal roller 24 is defined as the stretch ratio. The short roll gap "x" is defined as the narrowest distance between the circumferences of the chill roller 24 and second roller 27. This distance is measured directly by a feeler gauge which is readily available.

The roll gap is no more than 1 inch, more preferably about 0.005 to 0.05 inch, usually about 0.01 inch. The ratio of $V_2$ to $V_1$ provides a stretching ratio between about 1.25:1 and about 4:1. Preferably, the chill roller is a metal roller, such as an embossing roller, which cooperates with a backing roller to form a first nip for receiving web extrudate. Where nonembossed or flat films are desired, the chill roller is a flat chrome roller. The second metal roller cooperates with another backing roller (usually rubber) to form a second nip for receiving said film from said first nip. A vacuum box or air knife may be used with said chill roller.

A. Thermoplastic Polymers for the Film or Laminates

When a microporous film product is desired, the thermoplastic extrudate is a thermoplastic polymer containing a dispersed phase of pore-forming particles selected from the group consisting of inorganic filler and organic material and the stretched thermoplastic film is microporous having a moisture vapor transmission rate (MVTR) and being a barrier to the passage of liquid. An MVTR greater than about 1,000 g/m$^2$/day, according to ASTM E96(E) is achieved, preferably greater than about 1,000 to 4,000 g/m$^2$/day, according to ASTM E96(E). More broadly, the thermoplastic extrudate comprises a polymer wherein said polymer is selected from the group consisting of polyolefin, polyester, nylon, and blends or coextrusions of two or more of such polymers. Preferably, the polyolefin is selected from the group consisting of polyethylene (PE), polypropylene (PP), copolymers thereof, and blends thereof, wherein the polyolefin contains a dispersed phase of pore-forming particles selected from the group consisting of inorganic filler and an organic material, and said stretched thermoplastic film is microporous. The pore-forming particle filler is selected from the group consisting of calcium carbonate, barium sulfate, silica, talc, and mica.

When employing polyolefins to make a film or microporous product of the above type, i.e., PE, PP, LLDPE, LDPE or HDPE, the temperature of the film in said roll gap is in the range of about 20° to 100° C. (68° F. to about 212° F.), usually in the range of about 30° C. to 80° C. (86° F. to 176° F.). The temperature of said second roller is from about 21° C. to 82° C. (70° F. to 180° F.). The stretching temperature is controlled by a chill roller and the second roller controls $T_2$ at ambient temperature or a higher temperature which maintains the film in its molecularly orientable and stretchable state. In other words, $T_2$ is maintained at or below $T_1$. Film having a ratio of MD tensile strength at 25% elongation to CD tensile strength at 25% elongation of greater than 2 can be made which provides it with a modulus for web handling and CD tensile for softness.

Other thermoplastic polymers can be used which are elastomeric. Elastomeric polymers are selected from the group consisting of poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), poly(ethylene butylacrylate), polyurethane, poly(ethylene-propylene-diene), and ethylene-propylene rubber. This class of rubber-like polymers are generally referred to herein as polyolefins produced from single-cite catalysts. The most preferred catalysts are known in the art as metallocene catalysts whereby ethylene, propylene, styrene and other olefins may be polymerized with butene, hexene, octene, etc., to provide elastomers suitable for use in accordance with the principles of this invention. The elastomeric polymer also may contain pore-forming inorganic filler particles which provide microporosity to said film upon stretching. Stretched thermoplastic film having a thickness on the order of about 0.25 to about 10 mils (about 6 to 250 gsm) can be produced, preferably about 0.25 to 2 mils (about 6 to 50 gsm).

A preferred thermoplastic extrudate comprises about 30% to about 45% by weight of a linear low density polyethylene (LLDPE) or polypropylene (PP), about 1% to about 10% by weight of a low density polyethylene (LDPE), and about 40% to about 60% by weight of calcium carbonate filler particles. The composition can further contain a component selected from the group consisting of high density polyethylene (HDPE), titanium dioxide, and mixtures thereof. The thermoplastic extrudate can be a coextruded structure of one or more layers of different compositions, such as one or more layers of a polymer selected from the group consisting of polypropylene, LLDPE, LDPE, and blends thereof.

As stated above, both embossed and flat films may be produced according to the principles of this invention. In the case of an embossed film, the nip of rollers comprises a metal embossing roller and a rubber roller. The compressive force between the rollers forms an embossed film of desired thickness on the order of about 0.25 to about 10 mils. Rollers which provide a polished chrome surface form a flat film. Whether the film is an embossed film or a flat film, upon incremental stretching, at high speeds, microporous film products are produced having high moisture vapor transmission rate (MVTR) within the acceptable range of about 1000 to 4000 gms/m$^2$/day. Laminates of the microporous film may be obtained with nonwoven fibrous webs. The nonwoven fibrous web may comprise fibers of polyethylene, polypropylene, polyesters, rayon, cellulose, nylon, and blends of such fibers. A number of definitions have been proposed for nonwoven fibrous webs. The fibers are usually staple fibers or continuous filaments. The nonwovens are usually referred to as spunbond, carded, meltblown, and the like. The fibers or filaments may be bicomponent to facilitate bonding. For example, a fiber having a sheath and core of different polymers such as polyethylene (PE) and polypropylene (PP) may be used; or mixtures of PE and PP fibers may be used. As used herein "nonwoven fibrous web" is used in its generic sense to define a generally planar structure that is relatively flat, flexible and porous, and is composed of staple fibers or continuous filaments. For a detailed description of nonwovens, see *Nonwoven Fabric Primer and Reference Sampler* by E. A. Vaughn, Association of the Nonwoven Fabrics Industry, 3d Edition (1992).

In a preferred form, the microporous laminate employs a film having a gauge or a thickness between about 0.25 and 10 mils (a weight of 6 to 250 gsm) and, depending upon use, the film thickness will vary and, most preferably, in disposable applications is the order of about 0.25 to 2 mils in thickness. The nonwoven fibrous webs of the laminated sheet normally have a weight of about 5 gms/yd$^2$ to 75 gms/yd$^2$, preferably about 20 to about 40 gms/yd$^2$. The composite or laminate can be incrementally stretched in the cross direction (CD) to form a CD stretched composite. Furthermore, CD stretching may be followed by stretching in the machine direction (MD) to form a composite which is stretched in both CD and MD directions. As indicated above, the microporous film or laminate may be used in many different applications such as baby diapers, baby training pants, catamenial pads and garments, and the like where moisture vapor and air transmission properties, as well as fluid barrier properties, are needed.

B. Stretchers for the Microporous Film and Laminates

A number of different stretchers and techniques may be employed to stretch the film or laminate of a nonwoven fibrous web and microporous-formable film. These laminates of nonwoven carded fibrous webs of staple fibers or non-woven spun-bonded fibrous webs may be stretched with the stretchers and techniques described as follows:

1. Diagonal Intermeshing Stretcher

The diagonal intermeshing stretcher consists of a pair of left hand and right hand helical gear-like elements on parallel shafts. The shafts are disposed between two machine side plates, the lower shaft being located in fixed bearings and the upper shaft being located in bearings in vertically slidable members. The slidable members are adjustable in the vertical direction by wedge shaped elements operable by adjusting screws. Screwing the wedges out or in will move the vertically slidable member respectively down or up to further engage or disengage the gear-like teeth of the upper intermeshing roll with the lower intermeshing roll. Micrometers mounted to the side frames are operable to indicate the depth of engagement of the teeth of the intermeshing roll.

Air cylinders are employed to hold the slidable members in their lower engaged position firmly against the adjusting wedges to oppose the upward force exerted by the material being stretched. These cylinders may also be retracted to disengage the upper and lower intermeshing rolls from each other for purposes of threading material through the intermeshing equipment or in conjunction with a safety circuit which would open all the machine nip points when activated.

A drive means is typically utilized to drive the stationery intermeshing roll. If the upper intermeshing roll is to be disengageable for purposes of machine threading or safety, it is preferable to use an antibacklash gearing arrangement between the upper and lower intermeshing rolls to assure that upon reengagement the teeth of one intermeshing roll always fall between the teeth of the other intermeshing roll and potentially damaging physical contact between addenda of intermeshing teeth is avoided. If the intermeshing rolls are to remain in constant engagement, the upper intermeshing roll typically need not be driven. Drive may be accomplished by the driven intermeshing roll through the material being stretched.

The intermeshing rolls closely resemble fine pitch helical gears. In the preferred embodiment, the rolls have 5.935" diameter, 45° helix angle, a 0.100" normal pitch, 30 diametral pitch, 14½° pressure angle, and are basically a long addendum topped gear. This produces a narrow, deep tooth profile which allows up to about 0.090" of intermeshing engagement and about 0.005" clearance on the sides of the tooth for material thickness. The teeth are not designed to transmit rotational torque and do not contact metal-to-metal in normal intermeshing stretching operation.

2. Cross Direction Intermeshing Stretcher

The CD intermeshing stretching equipment is identical to the diagonal intermeshing stretcher with differences in the design of the intermeshing rolls and other minor areas noted below. Since the CD intermeshing elements are capable of large engagement depths, it is important that the equipment incorporate a means of causing the shafts of the two intermeshing rolls to remain parallel when the top shaft is raising or lowering. This is necessary to assure that the teeth of one intermeshing roll always fall between the teeth of the other intermeshing roll and potentially damaging physical contact between intermeshing teeth is avoided. This parallel motion is assured by a rack and gear arrangement wherein a stationary gear rack is attached to each side frame in juxtaposition to the vertically slidable members. A shaft traverses the side frames and operates in a bearing in each of the vertically slidable members. A gear resides on each end of this shaft and operates in engagement with the racks to produce the desired parallel motion.

The drive for the CD intermeshing stretcher must operate both upper and lower intermeshing rolls except in the case of intermeshing stretching of materials with a relatively high coefficient of friction. The drive need not be antibacklash, however, because a small amount of machine direction misalignment or drive slippage will cause no problem. The reason for this will become evident with a description of the CD intermeshing elements.

The CD intermeshing elements are machined from solid material but can best be described as an alternating stack of two different diameter disks. In the preferred embodiment, the intermeshing disks would be 6" in diameter, 0.031" thick, and have a full radius on their edge. The spacer disks separating the intermeshing disks would be 5½" in diameter and 0.069" in thickness. Two rolls of this configuration would be able to be intermeshed up to 0.231" leaving 0.019" clearance for material on all sides. As with the diagonal intermeshing stretcher, this CD intermeshing element configuration would have a 0.100" pitch.

3. Machine Direction Intermeshing Stretcher

The MD intermeshing stretching equipment is identical to the diagonal intermeshing stretch except for the design of the intermeshing rolls. The MD intermeshing rolls closely resemble fine pitch spur gears. In the preferred embodiment, the rolls have a 5.933" diameter, 0.100" pitch, 30 diametral pitch, 14½° pressure angle, and are basically a long addendum, topped gear. A second pass was taken on these rolls with the gear hob offset 0.010" to provide a narrowed tooth with more clearance. With about 0.090" of engagement, this configuration will have about 0.010" clearance on the sides for material thickness.

4. Incremental Stretching Technique

The above described diagonal, CD or MD intermeshing stretchers may be employed to produce the incrementally stretched film or laminate of nonwoven fibrous web and microporous-formable film to form the microporous film products of this invention. For example, the stretching operation may be employed on an extrusion laminate of a nonwoven fibrous web of staple fibers or spun-bonded filaments and microporous-formable thermoplastic film. The laminate of nonwoven fibrous web and microporous-formable film is incrementally stretched using, for instance, the CD and/or MD intermeshing stretcher with one pass through the stretcher with a depth of roller engagement at about 0.060 inch to 0.120 inch at speeds from about 550 fpm to 1200 fpm or faster. The results of such incremental or intermesh stretching produces laminates that have excellent breathability and liquid-barrier properties, yet provide superior bond strengths and soft cloth-like textures.

The following examples illustrate the method of making microporous film and laminates of this invention. In light of these examples and this further detailed description, it is apparent to a person of ordinary skill in the art that variations thereof may be made without departing from the scope of this invention.

EXAMPLES I

A microporous formable formulation containing 55% calcium carbonate, 36% homopolymer polypropylene (PP), 5% low density polyethylene (LDPE), 3% titanium dioxide master batch and 1% of combined processing master batch and antioxidant additives typically used in the film processing is extruded by a conventional single screw extruder 21 and a slot die 22 to form a web 26 which is about 450-500° F. The web 26 is leading into a pressure nip formed by a rubber roller 25 and a metal roller 24. The rubber roll is partially immersed in a water tank (not shown), so its surface is cooled by the water where the water is typically controlled at a temperature between 60-140° F. The web 26, after passing the first pressure nip formed by rubber roller 25 and metal roller 24, is immediately stretched in the machine direction between the first pressure nip and the second pressure nip formed by the rubber roller 28 and metal roller 27. The stretching ratio (R) is defined by the speed ($V_1$) of the first metal roller 24 and the speed ($V_2$) of the second metal roller 27. The stretch or roll gap (x) is defined by the narrowest distance between the circumferences of first metal chill roller 24 and second metal roller 27 which can be directly measured by any feeler gauge easily available. Table I demonstrates the experimental conditions and the results for Examples I-O to I-D. I-O is a comparative example where the speed of the first roller 24 and second roller 27 is the same (90 fpm) to make an unstretched film which is not microporous. In contrast, Example I-A to I-D are stretched. The surface topology of unstretched (Example I-O) and stretched (Examples I-A to I-D) are shown in FIGS. 4-8, identified as 1-O to 1-D.

Table 1 also demonstrates the benefits of this invention where the film is extruded without draw resonance at an original gauge of 85 g/m² and is stretched to 50 g/m² (comparing Examples I-O and I-D). The speed at the first roller ($V_1$) is 90 fpm and is 180 at the second roller ($V_2$) for a stretch ratio of 2:1. More broadly, this invention can achieve thin films which are up to 4 or more times thinner than the original extruded film without draw resonance.

TABLE 1

| Example | First Metal Roller Temp (° F.) | First Metal Roller Speed (fpm) | Second Metal Roller Temp (° F.) | Second Metal Roller Speed (fpm) | Roll Gap (x) (inch) | Stretch Ratio (R) ($v_2/v_1$) | Film Thickness (g/m²) | MVTR E-96E g/m²/day | MVTR Mocon g/m²/day |
|---|---|---|---|---|---|---|---|---|---|
| I-0 | 90 | 90 | 70 | 90 | 0.05 | 1:1 | 85 | 0 | 0 |
| I-A | 90 | 90 | 70 | 135 | 0.05 | 1.5:1 | 75 | 2794 | 4395 |
| I-B | 136 | 90 | 70 | 158 | 0.05 | 1.75:1 | 58 | 2840 | 4305 |
| I-C | 139 | 90 | 70 | 167 | 0.05 | 1.85:1 | 52 | 2848 | 4765 |
| I-D | 139 | 90 | 70 | 180 | 0.05 | 2.0:1 | 50 | 2908 | 5237 |

Note 1:
ASTM E-96E is measured at 100° F. and 90% RH

Note 2:
Mocon MVTR is measured at 37.8° C.

EXAMPLES II

Figure 9:
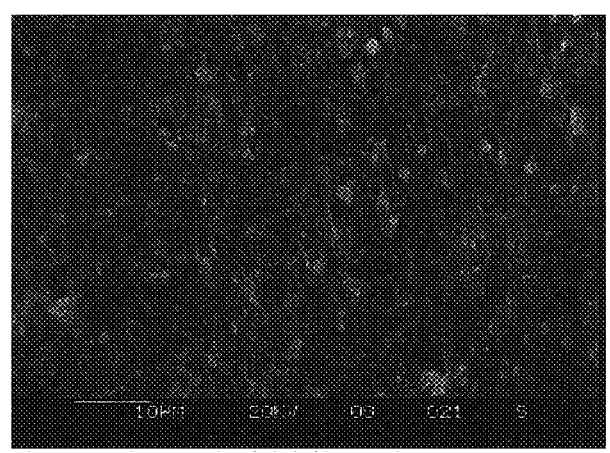
FIG. 9 is a SEM photomicrograph of a stretched film of Example II-A.
Figure 10:
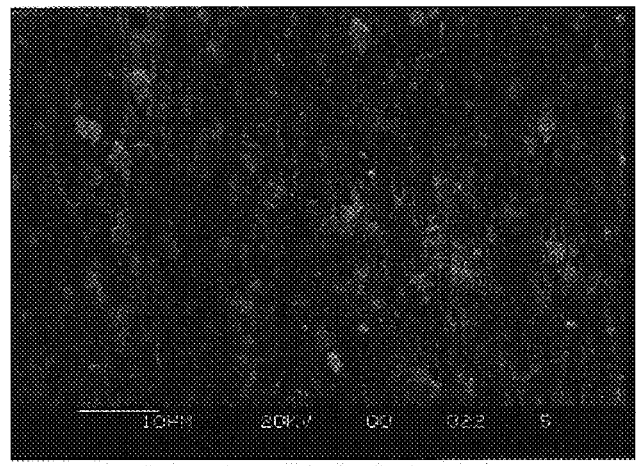
FIG. 10 is a SEM photomicrograph of a stretched film of Example II-B.
Figure 11:
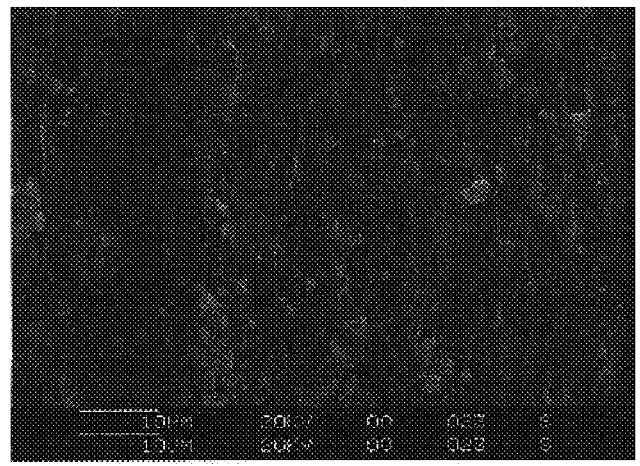
FIG. 11 is a SEM photomicrograph of a stretched film of Example II-C.

A microporous formable formulation containing 52.8% calcium carbonate, 38.8% LLDPE, 3% LDPE, 4.4% TiO$_2$ and 1% of processing aid master batch and antioxidant additives typically used in the film extrusion is extruded in a very similar manner as described in Examples I-O to I-D. The experimental conditions and the results are shown in the Table 2. The surface topologies of these examples are shown in FIGS. 9-11 identified as II-A, II-B and II-C.

Table 3 shows the mechanical properties of Example II-B as MDO stretched followed by incremental stretching in the MD and CD with the apparatus of FIG. 1 using intermeshing rollers 40, 41 and 42, 43 for stretching in the CD and MD, respectively. The intermeshing of stretching rollers are at ambient temperature and the engagement of the rollers on CD and MD are 0.050" and 0.040", respectively.

TABLE 2

| Example | First Metal Roller Temp (° F.) | First Metal Roller Speed (fpm) | Second Metal Roller Temp (° F.) | Second Metal Roller Speed (fpm) | Roll Gap (x) (inch) | Stretch Ratio (R) ($v_2/v_1$) | Film Thickness (g/m$^2$) | MVTR E-96E g/m$^2$/day | MVTR Mocon g/m$^2$/day |
|---|---|---|---|---|---|---|---|---|---|
| II-A | 125 | 100 | 70 | 200 | 0.050 | 2:1 | 54 | 4373 | 14,246 |
| II-B | 140 | 100 | 70 | 400 | 0.05 | 4:1 | 33 | 4540 | 15,219 |
| II-C | 140 | 100 | 70 | 400 | 1 | 4:1 | 35 | 4578 | 18,403 |

TABLE 3

| Example | Basis Weight (g/m$^2$) | MVTR E-96E | Tensile Strength (g/cm) MD | Tensile Strength (g/cm) CD | Elongation at Break (%) MD | Elongation at Break (%) CD |
|---|---|---|---|---|---|---|
| II-B as is | 32.9 | 4373 | 2038 | 144 | 51 | 489 |
| II-B with intermeshing | 30.6 | 4259 | 1922 | 140 | 50 | 421 |

EXAMPLES III

Table 4 illustrates Examples I-D and III-A and III-B where the MDO stretched film of I-D was subsequently incrementally stretched in the CD and MD under conditions as shown in the Table 4 for the CD and MD stretchers described above.

Figure 12:
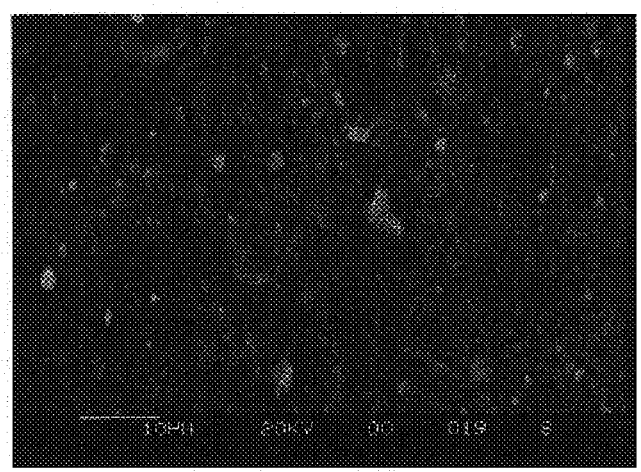
FIG. 12 is a SEM photomicrograph of a stretched film of Example III-A.
Figure 13:
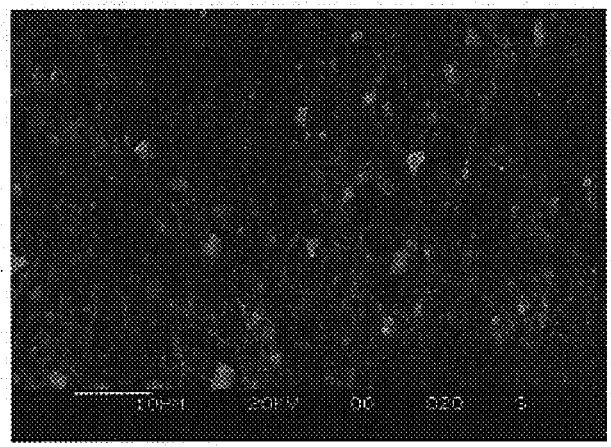
FIG. 13 is a SEM photomicrograph of a stretched film of Example III-B.

Table 5 demonstrates the mechanical properties of the Table 4 products. The MDO stretching and interdigitating stretching produced microporous film with adjusted and balanced properties such as micropore pore sizes, MVTR, MD and CD modulus and MD and CD tensile strength, as shown by Table 5. The MDO microporous films were continuously CD interdigitated, and CD interdigitated and MD interdigitated, respectively. The surface topologies of these examples are shown in FIGS. 12-13, identified as III-A and III-B.

TABLE 4

| Example | First Metal Roller Temp (° F.) | First Metal Roller Speed (fpm) | Second Metal Roller Temp (° F.) | Second Metal Roller Speed (fpm) | Roll Gap (x) (inch) | Stretch Ratio (R) ($v_2/v_1$) | Intermeshing Depth CD (inch) | Intermeshing Depth MD (inch) | MVTR E-96E g/m$^2$/day | Film Weight (gsm) |
|---|---|---|---|---|---|---|---|---|---|---|
| I-D | 139 | 90 | 70 | 180 | 0.05 | 2:1 | 0 | 0 | 2908 | 50 |
| III-A | 139 | 90 | 70 | 180 | 0.05 | 2:1 | 0.05 | 0 | 3362 | 45 |
| III-B | 139 | 90 | 70 | 180 | 0.05 | 2:1 | 0.05 | 0.04 | 3837 | 37 |

TABLE 5

| Example | Tensile Strength (g/cm) | | Elongation at Break (%) | | Tensile @2% Elongation (g/cm) | |
|---|---|---|---|---|---|---|
| | MD | CD | MD | CD | MD | CD |
| I-D | 1418 | 464 | 253 | 413 | 365 | 177 |
| III-A | 1027 | 593 | 296 | 322 | 282 | 47 |
| III-B | 1106 | 421 | 218 | 294 | 279 | 63 |

EXAMPLE IV

A microporous formable formulation having an ABA coextruded structure was extruded into a film with the MDO process where (A) contained 55.6% $CaCO_3$, 36.90% homopolymer polypropylene, 5.4% LDPE, 2% $TiO_2$ and 0.1% of antioxidant additive and (B) contained 52.8% $CaCO_3$, 39.2% LDPE, 3.5% LDPE, 4.4% $TiO_2$ and 0.1% antioxidant additive. The roll gap was at 0.01 inch and the stretching ratio was 1.0. The MDO process was followed with CD intermeshing at 0.055 inch and further followed with MD intermeshing at 0.045 inch using the CD/MD stretcher described above (see Example IV-A of Table 6). A microporous film was produced with a MVTR of 1300 (ASTM E96E) grams/m²/day and a film weight of 21 grams per square meter (gsm) with a MD tensile at 25% of 218 g/cm.

Then, the same ABA coextrusion was run, but the stretching ratio was increased from 1.0 to 1.25, 1.5, 1.75 and 2.0 while all other process conditions were kept the same (see Examples IV-B, C, D and E of Table 6). The film gauge was reduced from 21 gsm to 19.3, 16.5, 15 and 13.95, respectively. While the film gauge was reduced, the 25% MD tensile strength increased from 218 gsm to 240, 265, 311 and 327 gsm, respectively. This was very beneficial to web handling of the thin gauged film. While 25% MD tensile was increased, the 25% CD tensile decreased from 142 gsm to 118, 82, 58 and 54 gsm. This provided soft hand feel film, as well. These types of microporous films are suitable for making diaper and feminine care napkin outcover while providing high strength on MD direction for product high speed conversion, yet providing soft product for end use. Table 7 is provided to show the mechanical properties normalized to 21 gsm for same gauge comparison. Accordingly, microporous film products produced by the MDO process of this invention can be followed with CD and MD intermeshing to provide a film with its tensile strength at 25% elongation of MD to CD ratio of greater than 2.

Table 6 examples also demonstrate original gauge reduction of the extruded film without draw resonance at $V_1$ from 21 gsm (1 V-A) to 13.9 gsm at $V_2$ (IV-E), nearly two times thinner. The speed at $V_1$ was 325 fpm and 650 at $V_2$ for a stretch ratio of 2.

TABLE 6

| Example | First Metal Roller | | Second Metal Roller | | Roll Gap (x) (inch) | Stretch Ratio (R) ($v_2/v_1$) | Incremental Stretching | | Film Wt. (gsm) | MVTR E-96E | Tensile MD at 25% (g/cm) | Tensile CD at 25% (g/cm) |
|---|---|---|---|---|---|---|---|---|---|---|---|---|
| | Temp (°F.) | Speed (fpm) | Temp (°F.) | Speed (fpm) | | | CD (inch) | MD (inch) | | | | |
| IV-A | 148 | 325 | 70 | 325 | 0.01 | 1 | 0.055 | 0.045 | 21 | 1300 | 218 | 142 |
| IV-B | 148 | 325 | 70 | 406 | 0.01 | 1.25 | 0.055 | 0.045 | 19.3 | 1400 | 240 | 118 |
| IV-C | 148 | 325 | 70 | 488 | 0.01 | 1.5 | 0.055 | 0.045 | 16.5 | 1400 | 265 | 82 |
| IV-D | 148 | 325 | 70 | 569 | 0.01 | 1.75 | 0.055 | 0.045 | 15 | 1400 | 311 | 58 |
| IV-E | 148 | 325 | 70 | 650 | 0.01 | 2 | 0.055 | 0.045 | 13.9 | 1450 | 327 | 54 |

Note 1:
Film weight gsm is gram per square meter
Note 2:
MVTR is ASTM E96E in grams/m²/day
Note 3:
Tensile MD at 25% is the MD tensile strength at 25% elongation
Note 4:
Tensile CD at 25% is the CD tensile strength at 25% elongation

TABLE 7

| Sample | Film Wt. (gsm) | Tensile Strength at MD direction measured at different elongation | | | | | Tensile Strength at CD direction measured at different elongation | | | | |
|---|---|---|---|---|---|---|---|---|---|---|---|
| | | 10% (g/cm) | | 25% (g/cm) | | Ultimate (g/cm)/ break (%) As is | 10% (g/cm) | | 25% (g/cm) | | Ultimate (g/cm)/ break (%) As is |
| | | As is | At 21 gsm | As is | At 21 gsm | | As is | At 21 gsm | As is | At 21 gsm | |
| IV-A | 21 | 172 | 172 | 218 | 218 | 407/207 | 106 | 106 | 142 | 142 | 196/340 |
| IV-B | 19.3 | 171 | 186 | 240 | 261 | 457/339 | 79 | 86 | 118 | 128 | 166/313 |
| IV-C | 16.5 | 179 | 228 | 265 | 337 | 422/210 | 55 | 70 | 82 | 104 | 130/326 |
| IV-D | 15 | 187 | 262 | 311 | 435 | 452/118 | 39 | 55 | 58 | 81 | 87/316 |
| IV-E | 13.9 | 185 | 280 | 327 | 494 | 516/142 | 36 | 54 | 54 | 82 | 96/345 |

Note 1:
"As is" is the mechanical properties of the film weight as it is
Note 2:
"At 21 gsm" is the mechanical properties normalized to 21 gsm for same gauge comparison
Note 3:
"Ultimate (g/cm)/break (%)" are the Ultimate tensile strength (in grams/cm) at the elongation at break (in %)

EXAMPLE V

Figure 14:
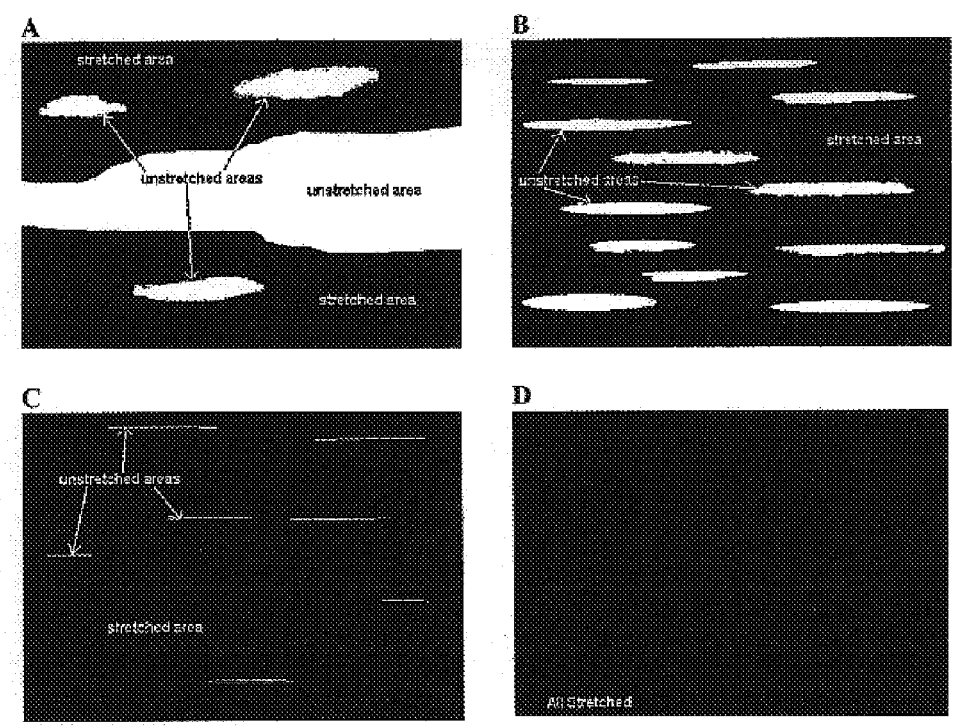
FIG. 14 is a schematic illustrative comparative exhibit of Examples V-A to V-D.

A microporous formable formulation containing 52.8% $CaCO_3$, 39.2% LLDPE, 3.5% LDPE, 4.4% $TiO_2$ and 0.1% antioxidant additives was extruded into a film and stretched at a gap greater than 1. At any stretching ratio, a uniformly stretched microporous film cannot be attained. Big areas of unstretched zones cannot be eliminated (see FIG. 14 photos for Examples V-A and V-B). However, at a roll gap at 1", microporous films with uniformly stretched appearance are achieved at a stretch ratio of 4:1 (see FIG. 14 photos for Examples V-C and V-D). With the roll gap reduced to 0.05 inch, uniform microporous films can be achieved as low as 1.25-1.50 as shown in FIG. 14 photos V-C and V-D. According to this Example V, a short stretching or roll gap at 1" or below is critical for a successful practice of this invention.

FIG. 14 illustrates the actual products of Example V which were produced to show the criticality of the short gap method and apparatus of this invention in order to provide acceptable microporous film products of substantially uniform gauge. Accordingly, "substantially uniform gauge" is meant to define those microporous film products where the degree of uniformity is such that no "tiger striping" is visually apparent to the naked eye and essentially complete uniform stretching of the product has been achieved with reference to sketches C and D of Example V in FIG. 14. Sketches A and B of actual products of Example V demonstrate unacceptable products where the tiger stripes are very visible to the naked eye which makes the product unsightly or ugly. In the case of product sketches A and B, the unstretched widths of tiger stripes are greater than ⅛ inch and are very visible to the naked eye, predominately over a significant portion of the product which makes the product unsightly or ugly. However, where the tiger stripes have been reduced or completely eliminated, as is the case in sketches C and D, acceptable product has been produced by uniform stretching to provide substantially uniform gauge. The fine lines as represented by sketch C are so fine, on the order of less than 1/32 inch that they do not detract from the eye appeal of the product or such lines do not exist at all as in the case of sketch D. Accordingly, one of ordinary skill in the art will understand that the objectives of this invention are accomplished by employment of the short gap to produce substantially uniform gauge as representative of the elimination of tiger stripes which render the product unacceptable, as represented by the comparative examples of Example V.

EXAMPLE VI

A microporous formable formulation having an ABA coextruded structure was extruded into a film with the MDO process where (A) contained 52.8% $CaCO_3$, 39.2% LLDPE, 3.5% LDPE, 4.4% $TiO_2$ and 0.1% antioxidant, and (B) contained 90% polypropylene polymer and 10% polyethylene polymer. The roll gaps were at 0.02 inch and 0.035 inch with stretching ratios at 3.0, 4.0 and 5.0. Films were produced with microporous layers on both sides and non-microporous layer in the middle. The resulted films have very low moisture vapor transmission rate equivalent to typical thin films of polyolefins, but provide microporous film surface for printing, nice hand feel, etc., which are suitable for many packaging applications. The following Table 8 shows the results.

TABLE 8

| Example | First Metal Roller | | Second Metal Roller | | Roll Gap | Stretch | | |
|---|---|---|---|---|---|---|---|---|
| | Temp (° F.) | Speed (fpm) | Temp (° F.) | Speed (fpm) | (x) (inch) | Ratio (R) ($v_2/v_1$) | Film Wt. (gsm) | MVTR E-96E |
| VI-A | 120 | 120 | 70 | 360 | 0.02 | 3.0 | 32.2 | 0-45 |
| VI-B | 140 | 120 | 70 | 480 | 0.02 | 4.0 | 34.5 | 30-90 |
| VI-C | 110 | 120 | 70 | 480 | 0.035 | 5.0 | 33.5 | 15-75 |

Note 1:
Film weight gsm is gram per square meter

Note 2:
MVTR is ASTM E96E in grams/m²/day

EXAMPLE VII

A 100% polyethylene resin is extruded into a single layer film by using the MDO process of this invention at a roll gap of 0.045 inch. A film has been produced using this technique at more than 1000 fpm. The product of this example has a substantially uniform gauge of 27 gsm and is inonmicroporous. Accordingly, the terms "subs tantially uniform gauge" are also meant to define those nonmicroporous films of high quality in uniform gauge or thickness. Table 9 describes the results.

TABLE 9

| Example | First Metal Roller Temp (° F.) | First Metal Roller Speed (fpm) | Second Metal Roller Temp (° F.) | Second Metal Roller Speed (fpm) | Roll Gap (x) (inch) | Stretch Ratio (R) ($v_2/v_1$) | Film Wt. (gsm) | MVTR E-96E |
|---|---|---|---|---|---|---|---|---|
| VII | 120 | 499 | 70 | 1025 | 0.045 | 2.05 | 27 | 0-30 |

Note 1:
Film weight gsm is gram per square meter
Note 2:
MVTR is ASTM E96E in grams/$m^2$/day Accordingly, the above Examples I-VII demonstrate that the method of this invention produces thermoplastic films at high speeds with a short roll gap where films are of substantially uniform gauge and are either non-microporous, breathable microporous, or non-breathable microporous.

The above data and experimental results demonstrate the unique thermoplastic films and method and apparatus of this invention for stretching said thermoplastic films. Other variations will be apparent to a person of skill in the art without departing from this invention.

What is claimed is:

1. A method of making thermoplastic film, comprising
   extruding a thermoplastic extrudate in the form of a web in its molten state,
   locating a chill roller operating at a peripheral velocity ($V_1$) and at a temperature ($T_1$) to receive and cool said web thereby forming a film,
   locating a second roller operating at a peripheral velocity ($V_2$) greater than said $V_1$ to receive said film at a temperature ($T_2$),
   spacing said second roller from said chill roller to provide a roll gap of no more than one inch between said chill roller and said second roller for stretching said film,
   uniformly stretching said film in said roll gap at a stretch temperature between said $T_1$ and $T_2$ at a speed between said $V_1$ and $V_2$ to form stretched thermoplastic film having a substantially uniform gauge.

2. The method of claim 1 wherein the roll gap is about 0.005 to about 0.05 inch.

3. The method of claim 1 wherein the roll gap is about 0.01 inch.

4. The method of claim 1 wherein the ratio of said V2 to V1 provides a stretching ratio between about 1.25:1 and about 4:1.

5. The method of claim 1 wherein said chill roller is a metal roll which cooperates with a backing roll to form a first nip for receiving said web.

6. The method of claim 5 wherein said chill roller is selected from the group of an embossing metal roll and a flat chrome roll.

7. The method of claim 5 wherein said backing roll is selected from the group of a rubber roll and a metal roll.

8. The method of claim 5 wherein said second roller cooperates with another backing roller to form a second nip for receiving said film from said first nip.

9. The method of claim 8 wherein said second roller is a metal roll.

10. The method of claim 8 wherein said backing roller is a rubber roll.

11. The method of claim 1 wherein a vacuum box is located adjacent to said chill roller.

12. The method of claim 11 wherein said chill roller is selected from the group of an embossing metal roll and a flat chrome roll.

13. The method of claim 11 wherein said second roller cooperates with a backing roller to form a first nip for receiving said film from said chill roller.

14. The method of claim 13 wherein said second roller is a metal roll and said backing roller is a rubber roll.

15. The method of claim 1 where said $V_1$ is slightly below that where the onset of draw resonance in the extruded web occurs and $V_2$ is in a range of up to about 4 or more times $V_1$.

16. The method of claim 15 where $V_2$ is about 2 to about 4 times $V_1$.

17. The method of claim 1 wherein the extruded film at the chill roller has an original gauge and the stretched film is up to about 4 or more times thinner than the original gauge.

18. The method of claim 1 wherein said film is uniformly stretched at speeds up to 4000 or more linear feet per minute.

19. The method of claim 1 wherein said thermoplastic extrudate is a thermoplastic polymer containing a dispersed phase of pore-forming particles selected from the group consisting of inorganic filler and organic material and said stretched thermoplastic film is microporous having a moisture vapor transmission rate (MVTR) and being a barrier to the passage of liquid.

20. The method of claim 19 wherein said MVTR is greater than about 1,000 g/m2/day, according to ASTM E96(E).

21. The method of claim 19 wherein said MVTR is greater than about 1,000 to 4,000 g/m2/day, according to ASTM E96(E).

22. The method of claim 1 wherein said thermoplastic extrudate comprises a polymer wherein said polymer is selected from the group consisting of polyolefin, polyester, nylon, and blends or coextrusions of two or more of such polymers.

23. The method of claim 22 wherein said polyolefin is selected from the group consisting of polyethylene, polypropylene, copolymers thereof, and blends thereof.

24. The method of claim 23 wherein said polyolefin contains a dispersed phase of pore-forming particles selected from the group consisting of inorganic filler and an organic material, and said stretched thermoplastic film is microporous.

25. The method of claim 24 wherein said pore-forming particle filler is selected from the group consisting of calcium carbonate, barium sulfate, silica, talc, and mica.

26. The method of claim 23 wherein the temperature of the film in said roll gap is in the range of about 20° C. to 100° C. (68° F. to about 212° F.).

27. The method of claim 26 wherein the temperature of the film in said roll gap in the range of about 30° C. to 80° C. (86° F. to 176° F.).

28. The method of claim 26 wherein the temperature of said second roller is from about 21° C. to 82° C. (70° F. to 180° F.).

29. The method of claim 1 wherein the stretching temperature is controlled by the chill roller.

30. The method of claim 29 wherein said second roller controls $T_2$ at ambient temperature or a higher temperature.

31. The method of claim 1 wherein said $T_2$ is maintained at or below $T_1$.

32. The method of claim 1 wherein said film has a ratio of MD tensile strength at 25% elongation to CD tensile strength at 25% elongation of greater than 2 which provides said film with a modulus for web handling and CD tensile for softness.

33. The method of claim 1 wherein said thermoplastic polymer is an elastomeric polymer.

34. The method of claim 33 wherein said elastomeric polymer is selected from the group consisting of poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), poly(ethylene butylacrylate), polyurethane, poly(ethylene-propylene-diene), and ethylene-propylene rubber.

35. The method of claim 34 wherein said polymer contains pore-forming inorganic filler particles which provide microporosity to said film upon stretching.

36. The method of claim 1 wherein said stretched thermoplastic film has a thickness on the order of about 0.25 (about 6 gsm) to about 10 (about 250 gsm) mils.

37. The method of claim 1 wherein said thermoplastic extrudate comprises
- about 30% to about 45% by weight of a linear low density polyethylene or polypropylene,
- about 1% to about 10% by weight of a low density polyethylene, and
- about 40% to about 60% by weight of calcium carbonate filler particles.

38. The method of claim 37 wherein the composition further contains a component selected from the group consisting of high density polyethylene, titanium dioxide, and mixtures thereof.

39. The method of claim 1 wherein said thermoplastic extrudate is a coextruded structure of one or more layers of different polymer compositions to produce a thermoplastic film selected from the group consisting of a
- (a) breathable microporous film,
- (b) nonbreathable microporous film, and
- (c) nonmicroporous film.

40. The method of claim 39 wherein the coextruded structure has one or more layers of a polymer selected from the group consisting of polypropylene, linear low density polyethylene (LLDPE), low density polyethylene (LDPE), and blends thereof.

41. The method of claim 1 comprising the further step of introducing said thermoplastic film into incremental stretching rollers to incrementally stretch said film.

42. The method of claim 41 wherein said incremental stretching rollers comprise a first section and a second section and said film is incrementally stretched in a first direction by said first section followed by incremental stretching in a second direction by said second section.

43. The method of claim 42 wherein said first and second stretching directions are substantially perpendicular to one another.

44. The method of claim 37 wherein said stretched thermoplastic film has a film thickness of about 0.25 to 2 mils.

45. A method of making a breathable and liquid barrier microporous thermoplastic film comprising
- extruding a microporous formable thermoplastic molten extrudate selected from the group consisting of polypropylene, polyethylene, copolymers thereof and blends thereof, said extrudate containing a pore-forming filler,
- locating a chill roller operating at a peripheral velocity ($V_1$) and at a temperature ($T_1$) to cool said web thereby forming a microporous formable film,
- locating a second roller operating at a peripheral velocity ($V_2$) greater than said $V_1$ to receive said film at a temperature ($T_2$),
- spacing said second roller from said chill roller to provide a roll gap of no more than one inch between said chill roller and said second roller for stretching said film,
- stretching said film in said roll gap at a stretch temperature between said $T_1$ and $T_2$ at a speed between said $V_1$ and $V_2$ to form a microporous thermoplastic film having a film thickness of about 0.25 to about 10 mils.

46. The method of claim 45 wherein the microporous film has a moisture vapor transmission rate (MVTR) greater than about 1,000 g/m2/day according to ASTM E96(E).

47. The method of claim 45 wherein said MVTR is about 1,000 to about 4,000 g/m2/day, according to ASTM E96(E).

48. The method of claim 45 wherein said microporous film has a ratio of MD tensile strength at 25% elongation to CD tensile strength at 25% elongation of greater than 2 which provides said microporous film with a modulus for web handling and CD tensile for softness.

49. The method of claim 1 wherein the film is annealed.

50. The method of claim 1 comprising the further step of laminating said extrudate to an extensible nonwoven fibrous sheet during said extrusion to form a laminate of said web and sheet before said uniform stretching.

51. The method of claim 1 comprising the further step of laminating said stretched thermoplastic film to a nonwoven fibrous sheet to form a laminate of said film and said sheet after said uniform stretching.

* * * * *